(12) United States Patent
Zilles et al.

(10) Patent No.: US 11,050,270 B2
(45) Date of Patent: Jun. 29, 2021

(54) MOBILE CHARGING STATION AND SYSTEM FOR LOCATING A BALL GAME DEVICE

(71) Applicants: Renatus Zilles, Andernach (DE); Lennart Jürges, Cologne (DE)

(72) Inventors: Renatus Zilles, Andernach (DE); Lennart Jürges, Cologne (DE)

( * ) Notice: Subject to any disclaimer, the term of this patent is extended or adjusted under 35 U.S.C. 154(b) by 346 days.

(21) Appl. No.: 16/072,172

(22) PCT Filed: Jan. 20, 2017

(86) PCT No.: PCT/EP2017/000075
§ 371 (c)(1),
(2) Date: Jul. 23, 2018

(87) PCT Pub. No.: WO2017/125249
PCT Pub. Date: Jul. 27, 2017

(65) Prior Publication Data
US 2019/0036360 A1    Jan. 31, 2019

(30) Foreign Application Priority Data

Jan. 22, 2016 (DE) .................... 10 2016 000 694.3

(51) Int. Cl.
*H02J 7/00* (2006.01)
*H02J 7/02* (2016.01)
(Continued)

(52) U.S. Cl.
CPC ........ *H02J 7/0027* (2013.01); *A63B 24/0021* (2013.01); *A63B 37/0003* (2013.01); *A63B 37/007* (2013.01); *A63B 43/004* (2013.01); *A63B 47/001* (2013.01); *A63B 57/20* (2015.10); *A63B 69/3658* (2013.01); *A63B 71/0669* (2013.01); *H02J 7/025* (2013.01); *H02J 50/10* (2016.02); *A63B 71/0619* (2013.01); *A63B 2024/0053* (2013.01); *A63B 2071/0625* (2013.01); *A63B 2071/0655* (2013.01);
(Continued)

(58) Field of Classification Search
CPC .......... H02J 7/0027; H02J 7/025; H02J 50/10; A63B 71/0669
USPC .................................................. 320/108, 115
See application file for complete search history.

(56) References Cited

U.S. PATENT DOCUMENTS 8,512,177 B2 * 8/2013 Krysiak ............. A63B 24/0021
473/570
8,525,472 B2 * 9/2013 Erario ..................... H02J 7/025
320/108
(Continued)

FOREIGN PATENT DOCUMENTS

DE            4007454 A1    9/1991
DE           20009198 U1    8/2000
(Continued)

*Primary Examiner* — Richard V Muralidar
(74) *Attorney, Agent, or Firm* — McCoy Russell LLP

(57) ABSTRACT

The invention relates to a mobile charging station for at least one ball game device, in particular in the form of a golf ball, comprising at least one internal energy source and at least one holding means for holding and fixing at least one ball game device having integrated electronics, wherein the at least one held ball game device can be charged or can be supplied with energy by the at least one internal energy source.

17 Claims, 4 Drawing Sheets

(51) Int. Cl.
    *A63B 71/06*     (2006.01)
    *A63B 43/00*     (2006.01)
    *H02J 50/10*     (2016.01)
    *A63B 24/00*     (2006.01)
    *A63B 37/00*     (2006.01)
    *A63B 47/00*     (2006.01)
    *A63B 57/20*     (2015.01)
    *A63B 69/36*     (2006.01)

(52) U.S. Cl.
    CPC ... *A63B 2071/0694* (2013.01); *A63B 2209/08* (2013.01); *A63B 2220/12* (2013.01); *A63B 2220/40* (2013.01); *A63B 2220/51* (2013.01); *A63B 2220/801* (2013.01); *A63B 2220/808* (2013.01); *A63B 2225/15* (2013.01); *A63B 2225/20* (2013.01); *A63B 2225/50* (2013.01); *A63B 2225/54* (2013.01); *A63B 2225/74* (2020.08)

(56) References Cited

U.S. PATENT DOCUMENTS

| | | | | |
|---|---|---|---|---|
| 10,523,053 | B2* | 12/2019 | Munson | H02J 5/005 |
| 10,589,162 | B2* | 3/2020 | Koo | A63B 43/06 |
| 2002/0091017 | A1 | 7/2002 | Kuesters | |
| 2004/0142766 | A1 | 7/2004 | Savarese et al. | |
| 2008/0207357 | A1* | 8/2008 | Savarese | G01S 19/51 473/407 |
| 2010/0227705 | A1* | 9/2010 | Huang | A63B 43/06 473/353 |
| 2011/0074345 | A1 | 3/2011 | Erario et al. | |
| 2011/0077094 | A1 | 3/2011 | Erario et al. | |
| 2013/0274040 | A1* | 10/2013 | Coza | A63B 24/0062 473/570 |
| 2014/0347193 | A1* | 11/2014 | Ljung | G08C 17/02 340/870.01 |
| 2015/0094168 | A1* | 4/2015 | Unger, Sr. | A63B 43/06 473/353 |
| 2015/0333302 | A1* | 11/2015 | Johns | G04G 19/00 429/127 |
| 2016/0001136 | A1* | 1/2016 | King | H02J 50/40 320/108 |
| 2017/0302098 | A1* | 10/2017 | Miller | H02J 7/025 |
| 2018/0161656 | A1* | 6/2018 | Koo | A63B 57/20 |

FOREIGN PATENT DOCUMENTS

| | | |
|---|---|---|
| DE | 20004174 U1 | 7/2001 |
| WO | 9113655 A1 | 9/1991 |
| WO | 2008100430 A1 | 8/2008 |

* cited by examiner

MOBILE CHARGING STATION AND SYSTEM FOR LOCATING A BALL GAME DEVICE

CROSS-REFERENCE TO RELATED APPLICATION

The present application is a U.S. National Phase of International Patent Application Serial No. PCT/EP2017/000075, entitled "MOBILE CHARGING STATION AND SYSTEM FOR LOCATING A BALL GAME DEVICE," filed on Jan. 20, 2017. International Patent Application Serial No. PCT/EP2017/000075 claims priority to German Patent Application No. 10 2016 000 694.3, filed on Jan. 22, 2016. The entire contents of each of the abovementioned applications are hereby incorporated by reference in their entirety for all purposes.

TECHNICAL FIELD

The invention relates to a mobile charging station for a ball game device, in particular in the form of a golf ball, and a system for locating a ball game device.

BACKGROUND AND SUMMARY

In many ball sports it can be of interest for the players to obtain current position information from the ball game device used, in particular for sports in which the ball game device is moved or hit by the player over large distances. There can be different reasons for the interest in this data, which ranges from the simple locating of the game device in order to retrieve it, to a complex analysis of the movement profile. Besides the interest in the exact location information, there is also a need for more detailed information, such as acceleration, speed of rotation about the ball axis, speed of movement, flying direction and height, etc.

In particular in the case of golf, golfers spend a large part of the playing time searching the fairway for their ball hit beforehand. On average, each player spends 24 minutes searching for the ball per 18-hole round. This is not only frustrating for the player looking for the ball and his fellow players, but also inhibits the enjoyment of the game, since quicker and usually better players advance faster and subconsciously put pressure on those searching for the ball. For the golf course managers as well, financial losses are incurred, since otherwise more flights could be started. Furthermore, the financial aspect with regard to the repeated loss of the ball game device is also not negligible. An average golf ball costs 2 to 3 euros, and therefore this can add up to amounts that are not insignificant. Globally, approximately 800,000,000 golf balls are lost on golf courses every year.

Existing finder systems are limited to finding the golf ball and, due to the additionally required complex hardware, such as special golf balls or a direction finder, are costly, proprietary, awkward to use and offer only imprecise locating. In particular, it has previously been problematic to integrate the required hardware for the locating of the golf ball in the available "installation space" within the golf ball, which is only very limited. Sufficient energy supply of the required electronics during an entire round of golf on an 18-hole course also constitutes a prerequisite that is not to be underestimated, since the playing time is between 3.5 and 6 hours depending on the level of play and size of flight.

High demands are additionally placed on the data transmission from the ball game device to an evaluation station. This poses problems for the developers of some sports, such as golf. With striking distances of more than 200 m, large transmission distances are necessary. Conventional transmission standards such as Bluetooth often satisfy the abovementioned transmission distances only under laboratory conditions, particularly if minimal energy consumption is required.

Solutions are thus sought which enable an optimal system for locating a ball game device, in particular a golf ball, and which in addition simplify the handling of a system of this kind for the user and thus make it more practicable.

This object is achieved on the one hand by a mobile charging station for at least one ball game device, in particular a golf ball. The ball game device can have a ball size of at least 40 mm and at most 50 mm, ideally at least 42.68 mm. The weight of the ball game device is preferably at most 50 g, particularly preferably at most 45.93 g. For presentation of the invention, reference will be made hereinafter primarily to a golf ball as ball game device. The features and advantageous embodiments presented hereinafter, however, can be utilised without limitation for any conceivable ball game device.

The proposed mobile charging station contains at least one internal energy source and at least one holding means for holding and fixing at least one ball game device having integrated locating electronics. The internal energy source corresponds to at least one integrated energy store, from which electrical energy in accordance with the invention can be provided for at least one ball game device held by the charging station. The available energy is used preferably to charge an internal energy store of the ball game device by the mobile charging station or to at least temporarily feed energy to the integrated electronics of said ball game device.

The mobility of the charging station makes it extremely comfortable for the players to transport it with them while the ball game in question is being played. In particular for golf, the mobile charging station according to the invention has proved to be particularly advantageous because it can be easily transported with the necessary golf equipment. The golf player can place the golf ball in the mobile charging station during a round of golf between the individual holes in order to charge the golf ball in the interim. The player continues the round with use of a sufficiently charged golf ball, which can be replaced by the player should the energy supply of the golf ball be insufficient at least for the next hole. Long golf rounds are not an insurmountable obstacle in respect of a sufficient energy supply of the ball game device, since interim charging can be ensured at all times with the aid of the mobile charging station. The energy store of the charging station is dimensioned here in such a way that it can provide at least enough electrical energy to supply a golf ball during a round of golf.

The energy transmission from the charging station to the at least one held ball game device is ideally contactless, i.e. there is no need for any additional electrical connections, and instead it is sufficient to place the ball game device in the holding means provided for it. The energy transmission can be inductive. To this end, the mobile charging station comprises one or more integrated induction coils, which are connected to the internal storage means of the charging station, with in particular at least one induction coil being provided per holding means. Near-field transmission with resonant inductive coupling is preferred in this context.

Alternatively, a charging process based on energy harvesting is also conceivable, in which the electrical energy is obtained from the surroundings of the ball or the black box having an energy converter. This can be implemented for example by ultrasound (for example uBeam) or vibration (for example micromems). For example, a frequency transmission with 145 dB to 155 dB can transfer several watts of power, is not acoustically perceptible by humans, and is safe for the human body from a medical viewpoint.

Besides the charging function according to the invention of the mobile charging station, in accordance with a particularly preferred embodiment of the invention the mobile charging station has a further fundamental task. The charging station can preferably be equipped with one or more communication modules in order to establish a bidirectional communication link to at least one ball game device. On the one hand, location data of the ball game device can thus be transmitted via the communication interface to the mobile charging station, and on the other hand any data and information or control commands can be transmitted from the charging station to the ball game device. The communication module and the used transmission technology are suitable for covering large distances between charging station and ball game device in open countryside, in particular on a golf course. Transmission distances of more than 200 m, preferably more than 250 m, and ideally more than 300 m are conceivable.

In accordance with a further particularly preferred embodiment the mobile charging station comprises at least one further communication module, which works with a differing transmission technology compared to the first communication module. The second communication module is used to establish a communication transmission path with at least one user terminal, for example a mobile terminal, such as a smartphone, tablet, laptop, wearable (smartwatch), and a stationary device, such as a PC, external server, cloud, etc. A coupling of the two communication modules is provided particularly preferably within the charging station, such that the mobile charging station can provide a kind of gateway functionality so as to be able to forward data between the user terminal and ball game device.

This results in a series of advantages. The user can receive and evaluate or display the received data of the ball game device using his user terminal, for example his mobile terminal, which he presumably takes with him anyway on the golf course. Modern smartphones are equipped with known communication modules that transmit on the basis of WLAN or Bluetooth. The second communication module is preferably based on a conventional radio standard, for example one of the known and future Bluetooth standards or a WLAN standard, for example IEEE 802.11, etc. On the basis of these preconditions, the communication link between charging station and smartphone is possible without difficulty and without further aids.

Since the maximum transmission distance of these known radio standards is impractical in golf, an intermediary having a greater range is created between the user terminal and ball game device by means of the mobile charging station in accordance with this advantageous embodiment, which intermediary can cover the routine transmission distances between terminal and ball game device of more than 200 m or more than 300 m. To this end, the installed first communication module of the charging station is based on a differing transmission technology, which copes with transmission distances of this kind and yet still operates as energy efficiently as possible. For example, a first communication module that works by short-range device (SRD) has proved to be suitable. The first communication module particularly advantageously utilises an ISM band for the radio transmission. No interference caused by jammers is anticipated in an open environment, in particular on a golf course. The mobile charging station thus acts as a mobile intermediary having a greater range, which couples a Bluetooth or WLAN radio link with a short-range device. Here, it should be mentioned that the transmitted data does not have to be directly forwarded between both transmission paths, and instead alternatively can also be buffered within the charging station. A storage means required for this purpose can preferably be integrated in the charging station.

The installation of a GSM module, a SIM card or an E-SIM card in the charging station is also conceivable in order to be able to forward the data received from the ball game device to a server or another terminal, i.e. a user terminal, or in order to be able to receive data from said server or terminal for forwarding to the golf ball.

It is also conceivable that further communication modules can be integrated in the mobile charging station. For example, such modules can be modules for NFC or RFID or UHF communication. Thus, not only can information be detected from a ball game device, but further sporting equipment could be equipped with suitable passive or active transponders for identification by the charging station. It is conceivable to equip the golf bag, inclusive of golf clubs, with suitable transmitters so as to be able to detect more detailed data regarding the activity of the sportsman, i.e. it could be possible to automatically detect which golf club the player used to hit the golf ball. Such detailed data is of interest for subsequent game analysis and therefore should be suitable for detection by the charging station and, as appropriate, transmission to a user terminal.

Outstanding features of the charging station are its mobility and the ease with which it can be transported while the sport in question is being played. The charging station preferably comprises possible fastening means in order to be fastened comfortably to other sporting equipment and/or to clothing. For example, in the case of a charging station for golf balls, said charging station has possible clip means so as to be able to be fix the charging station in a stable manner to a golf bag. Direct integration of the mobile charging station in the sporting equipment, for example in a golf cart or a golf trolley, or for direct integration in the clothing of the player, is also conceivable. Of course, the charging station can also be permanently integrated in a golf bag. For the concept of the present application essential to the present invention, it is irrelevant whether the mobile charging station can be fixed permanently or releasably to the sporting equipment or the clothing of the sportsman, or is part of the clothing.

In accordance with the invention, the charging station comprises at least one holding means for at least one ball game device. A mechanical design of the holding means in order to hold the golf ball mechanically in the charging station and fix said ball in a stable manner is conceivable. Retaining means that are adapted to the shape of the ball game device and enable the ball to be held in a clamped manner have proved to be advantageous. Variants with a form fit, for example by an actuatable locking means, are also conceivable. A magnetic fixing of the ball game device to the charging station has proved to be a suitable alternative, provided that the ball game device comprises possible magnetisable components. To this end, the charging station can comprise a permanent magnet or alternatively electromagnetic components, which in this case can be activatable selectively.

In a particularly preferred embodiment of the invention the holding means is not only used to hold and fix the ball game device, but instead should also be aligned in an optimal position in the charging station so as to be able to ensure a particularly energy-efficient energy transmission. The efficiency of the charging process in the case of inductive charging is primarily dependent on the position and orientation of the induction coils of both charging partners. It is therefore desirable to bring these into the most optimal alignment possible, turned towards one another, so as to achieve an optimal energy transmission from the charging station to the ball game device. For this purpose, at least one holding means has some sort of alignment means in order to be able to move the ball device into the optimal position. In the case of mechanical fixing, possible corresponding elements on the ball game device and holding means can be formed as alignment means which exclusively allow an optimal positioning of the golf ball in the holding means. In the case of magnetic fixing this process can be implemented by corresponding electronics having suitable open-loop or closed-loop control. However, manual alignment is also conceivable, wherein the optimal position is indicated to the player by corresponding markings on the ball and/or on the holding means of the charging station.

The charging station can additionally have the form of a dongle or a sleeve for mobile telephones or tablets, such that it enables a particularly high level of comfort and good user-friendliness in respect of mobile use. With regard to its fundamental function, it enables the user to attach the mobile telephone to the charging station via a cable in order to use the energy source of the charging station to charge the mobile telephone (portable battery). The described function of the gateway is enabled by the charging station, here likewise in that the communication between ball game device and smartphone is made possible both via a wireless data link and a wired data link. The one or more ball game devices can be held in different ways in accordance with the holding means already described. In the case of a sleeve for mobile telephones or tablets, this can be implemented for example via one or more recesses on the surface, in which the ball/balls can be fixed mechanically or magnetically, and in the case of a dongle by way of insertion, for example.

If the wired connection has been established between charging station and mobile telephone/tablet, said connection is preferably used for data exchange between the communication partners, so as to expend, in the ideal case, as little energy as possible for the wireless data exchange between charging station and mobile telephone/tablet.

In accordance with a further preferred embodiment of the invention the charging station comprises a charging logic. A charging logic of this kind on the one hand provides an appropriate means for identifying a ball game device inserted in a holding means. Only following successful detection of an inserted ball game device will the charging process then be started. A logic of this kind can be implemented by suitable sensors or mechanical switches, which detect the inserted ball.

Alternatively, the induction coils of the charging station can also be used as sensors. The charging logic is preferably suitable for emitting and/or receiving signals via the induction coils. For example, the charging logic could comprise means for regularly emitting information, for example a ping, via the one or more induction coils of the charging station and transmitting said information to a ball game device possibly held in the holding means. A held ball game device can be detected on the basis of a possible response, which can be received by the charging logic via the induction coil of the mobile station and/or via the first communication module of the charging station. In this way, further information can additionally be exchanged between ball game device and charging station, for example information for identifying the ball game device, information regarding the state of charge of the ball game device, etc.

Besides the transmission of information with regard to the state of charge of held ball game devices, the charging station can alternatively or additionally measure the current state of charge of a held ball game device. It is advantageous in this regard if the state of charge of the particular ball game device is signalled visually and/or acoustically to the user at the charging station. As necessary, the charging station could also submit a recommendation to the user for a held ball game device which should be used subsequently for the sporting activity on account of its state of charge. A recommendation for a ball game device depending on its state of charge can be made in collaboration with an application run on the user terminal, which application receives necessary data with regard to the state of charge of inserted ball game devices from the charging station and on this basis emits a recommendation to the user.

In addition, the charging station can be equipped with one or more interfaces for external devices, for example with one or more USB ports and optionally with Thunderbolt, FireWire or with other parallel or serial interfaces. These interfaces can be used on the one hand for bidirectional transmission of information between a charging station and external device, but alternatively can also be suitable for energy supply of one or more external devices from the energy source of the charging station or for charging of the energy source of the charging station. For example, the smartphone of the golf player can be charged via a USB port via the charging station.

For this case, a further supplementary security function can be implemented in the charging logic. The charging logic monitors the state of charge of the internal energy source of the charging station. In the event that the state of charge falls below a definable minimum state of charge, the energy supply from the internal energy source can be regulated, in particular for example the charging function of external devices via the interface is deactivated, so as to utilise the available remaining energy exclusively or substantially for the charging process of held ball game devices and for continued operation of the charging station as a data store and communication intermediary between golf ball and smartphone until the game is finished.

The minimum state of charge can be defined for example depending on the playing schedule of the golf player. For example, the player can input which holes or how many holes are still to be played, so that the necessary remaining state of charge is then calculated, moreover on the basis of the player's level of play (number of anticipated strokes, etc.). The calculation can be made likewise in collaboration with an application installed on the user terminal.

The charging station can optionally be equipped additionally with an internal locating module, for example with a GPS module. Alternatively, the charging station can be connectable to an external locating module via at least one communication module and can call up location data from the external locating module. This location data, either data of the internal GPS module or of an external locating module, can be transmitted to at least one ball game device via the first communication module so as to optimise the locating within the ball game device. The keywords here are "Assisted GPS".

The charging station can additionally be equipped with at least one storage means so as to be able to buffer the data arriving via one or more communication modules and/or so as to be able to provide said data for the subsequent call-up, also via interfaces for external storage media which are inserted or connected temporarily. Identification data of the charging station or ball game devices allocated to the user could also be stored within the internal storage means. The charging station can thus identify and distinguish held ball game devices belonging to the player in question and other players. This is of significance particularly for the forwarding of data to the user terminal, but can also play a role in the prior management of the internally stored remaining energy, since any ball game devices belonging to the user in question should be processed with preference.

The charging station can additionally be equipped with at least one microphone for recording possible game noise. The recording of possible game noise of the at least one ball game device, for example recording the sound of the ball game device or the golf ball being hit, is conceivable, for example. This additional information can be stored together with the location data and all further received data of the ball game device and/or can be made available to an external device via the second communication module.

It is also conceivable that the charging station is suitable for establishing a meshed network with further charging stations or other communication and routing partners. To this end, the charging station comprises a corresponding network processor with routing logic for establishing an ad hoc network or meshed network. Networks of this kind are characterised by their stability, there being no need for infrastructure. The meshed network is used for example to bridge difficult transmission conditions or larger transmission paths, since information can be forwarded to the intended target charging station via one or more network nodes.

Besides the mobile charging station, the present invention relates to a system for locating a ball game device, in particular a golf ball. The system comprises at least one ball game device having integrated electronics for locating the ball game device. Besides the locating means of the ball game device, possible sensors for recording the movements of the ball game device can be provided optionally. In addition, the system comprises at least one mobile gateway for the communication of the at least one ball game device with at least one user device.

The mobile gateway can preferably be embodied in accordance with the mobile charging station according to the invention or an advantageous embodiment of the mobile charging station. The same advantages and properties as have already been explained on the basis of the mobile charging station are thus provided for the system. A description of these, which would be repetitive, has thus been omitted for this reason.

A further aspect of the invention relates to the ball game device that is used for the locating system or for communication with the mobile charging station. The ball game device can have a ball size of at least 40 mm and at most 50 mm, ideally of at least 42.68 mm. The weight of the ball game device is preferably at most 50 g, particularly preferably at most 45.93 g. As a result of these physical specifications, extreme prerequisites are placed on the hardware integration. The ball game device in particular relates to a golf ball. The following embodiments, however, can be readily applied to all ball game devices, such as soccer balls, tennis balls, handballs, basketballs, American footballs, cricket balls, etc. The ball game device comprises at least one integrated locating module, in particular a GPS receiver, for determining the location of the ball game device.

In addition, a communication module for bidirectional data exchange with a base station is contained. In particular, the ball game device can communicate via a mobile gateway with a user terminal, such as a smartphone, laptop, tablet, wearable, etc. The base station or the mobile gateway is advantageously a mobile charging station according to the present invention. The communication module of the ball game device preferably transmits by means of short-distance radio, preferably in the ISM band. A variant in which the ball game device directly communicates via short-distance radio with the mobile user terminal, in particular a mobile telephone, provided this includes a suitable radio transceiver, is also conceivable in principle.

The required electronic components of the golf ball or of the ball game device can be moulded in synthetic resin, and in a resilient, flexible damping material, or can be fixed in the ball game device by means of a resilient mounting. A structure with one or more harder inner cores and preferably with at least one softer outer core in order to ensure the above-described resilience of the golf ball has proved to be suitable.

The integrated electronics can be housed on a plurality of smaller multi-layer circuit boards, these preferably being housed in a protected manner, layered one above the other and thus stacked centrally, in the core of the golf ball.

The following structure has proved to be advantageous as considered from the core of the ball game device outwardly. The entire required electronics or at least a large part of the required electronics, i.e. the GPS module, a microprocessor, at least one communication module, etc., sits at a central point in the middle of the ball game device. The electronics are preferably encased by one or more battery shells or by batteries adapted to the shape of the electronic core. The battery shells or batteries adapted to the shape of the core can be divided into a battery part above the electronics core and a battery part beneath the electronics core.

A casing can surround the battery. This casing preferably carries one or more antenna elements, which are attached expediently to the outer surface of the casing. An embodiment with two half-shells, which are assembled to form the casing surrounding the batteries, is conceivable. For example, each half-shell can carry an antenna element. The embodiment with a plurality of antenna elements ensures a practically position-independent signal emission or reception quality, since, due to clever placement of the antenna elements, part of the antenna structure is always arranged at the top, or the antenna signal can emit or receive without obstacle. A structure of the antenna in the form of a ring consisting of flexible conductors (for example made of polyamide) from which the antenna is formed is likewise conceivable.

A further shell made of hard rubber, synthetic resin or plastics material can be provided around the outer casing with the antenna, wherein both a hard rubber shell and an outer plastics material shell are preferably provided with the golf ball design, known per se.

It is particularly preferable if the GPS module and the communication module utilise one and the same antenna structure for the wireless transmission with a base station/gateway/charging station. For example, it is conceivable that the communication module operates in the ISM band range, such that particularly advantageous properties for the structuring of the antenna structure are provided on account of the frequency ratio of approximately 2:1 or 1:2 between the used frequency band of the GPS communication (for example 1.8 GHz) and the ISM band (for example 868 MHz).

Separate antennas, in particular induction coils, are used for the wireless energy transmission for charging the internal battery. It is conceivable that this antenna structure is divided into a plurality of antennas, for example an antenna structure on the upper semi-sphere and an antenna structure on the lower semi-sphere, so as to maintain a certain position-independent flexibility in respect of the holding of the ball game device in a charging station.

In particular in the case of golf balls, extremely high forces occur, which act on the ball game device. The integrated electronics and the installed battery have to be able to withstand the effective forces that occur. The use of a battery of the FLCB type (FPC lithium ceramic battery), which contains a lithium ceramic solid-state electrolyte, has proved to be particularly advantageous, wherein lithium-air batteries are also conceivable in principle. Batteries of this kind are characterised by a very high mechanical resistance (impacts, vibrations, etc.) and high formability, such that they can be rolled and bent, for example without catching fire or leaking. They have a low weight and good energy density and can be stacked in thin layers. As a result of these properties they are particularly well suited for use in a ball game device. They do not require any cooling or protective devices and can thus also be used themselves as a protective device for sensitive objects.

With regard to the shape factor, the battery is based ideally on the shape of the ball, for example is hemispherical. This can be implemented for example in that the battery is layered from individual layers, wherein the individual layers of the battery are preferably produced, stacked and laminated in the corresponding shape. The individual layers for shaping the stack can also be shaped differently in order to attain a pyramid-like battery stacking based on a half-shell.

In accordance with an alternative variant there is a possibility to cut the individual layers of the battery into parts of equal size, similarly to a cake for example, and to form said parts such that they rest closely against a desired object shape.

Besides the GPS receiver and the radio module, the ball game device can additionally be equipped with further sensors, for example an acceleration and/or movement sensor, a gyroscope or rpm counter and/or a light sensor and/or temperature or moisture sensor.

The ball game device can also comprise possible output means for acoustic, visual or haptic signalling of possible status messages. For example, the integration of at least one loudspeaker is conceivable in order to audibly output an audio signal. The output audio signal can advise the player acoustically of the position of the ball game device. The provision of one or more lighting means, for example LEDs, is also conceivable in order to enable optical signalling. An active luminosity of the ball game device can thus be provided, which improves the likelihood of retrieving the ball game device in difficult light conditions. A continuous, periodic or even flashing illumination is conceivable. In conjunction with a light sensor, the lighting function can be automatically determined and activated depending on the ambient light conditions. The light sensor can also be used for the purposes of communication with the base station/gateway/charging station. The one or more lighting means can also be used for visual display of the status. For example, the state of charge of the battery could be displayed by different colouring. The status of the communication connection to a base station/gateway/charging station, or the GPS status could just as well be portrayed.

It is also conceivable that at least one vibration element is integrated within the ball game device in order to enable haptic signalling.

The installation of a GSM module, a SIM card or an E-SIM card in the ball game device is also conceivable.

For the fixing and/or alignment of the ball game device in a mobile charging station according to the present invention, the ball game device additionally comprises fixing and alignment elements, for example a separate element made of steel or a magnet or a similar material, which is contained in the ball game device and corresponds with a fixing and alignment element of the charging station.

It is also conceivable that the ball game device is suitable for establishing a meshed network with further ball game devices, charging stations according to the present invention, or other communication and routing partners. To this end, the ball game device comprises a corresponding network processor with routing logic for establishing an ad hoc network or meshed network. Networks of this kind are characterised by their stability, there being no need for infrastructure. The meshed network is used for example in order to bridge difficult transmission conditions or larger transmission distances, since information can be forwarded from the sender to the desired receiver of the message via one or more network nodes.

A further aspect additionally relates to a software-based application, also referred to as an app, which can be run on a user terminal (smartphone, tablet, PC, server, wearable, etc.) and is suitable for data evaluation and display of the recorded data of a ball game device, in particular a golf ball.

Further advantages and details of the invention will be explained hereinafter on the basis of illustrative figures.

DETAILED DESCRIPTION

Figure 1:
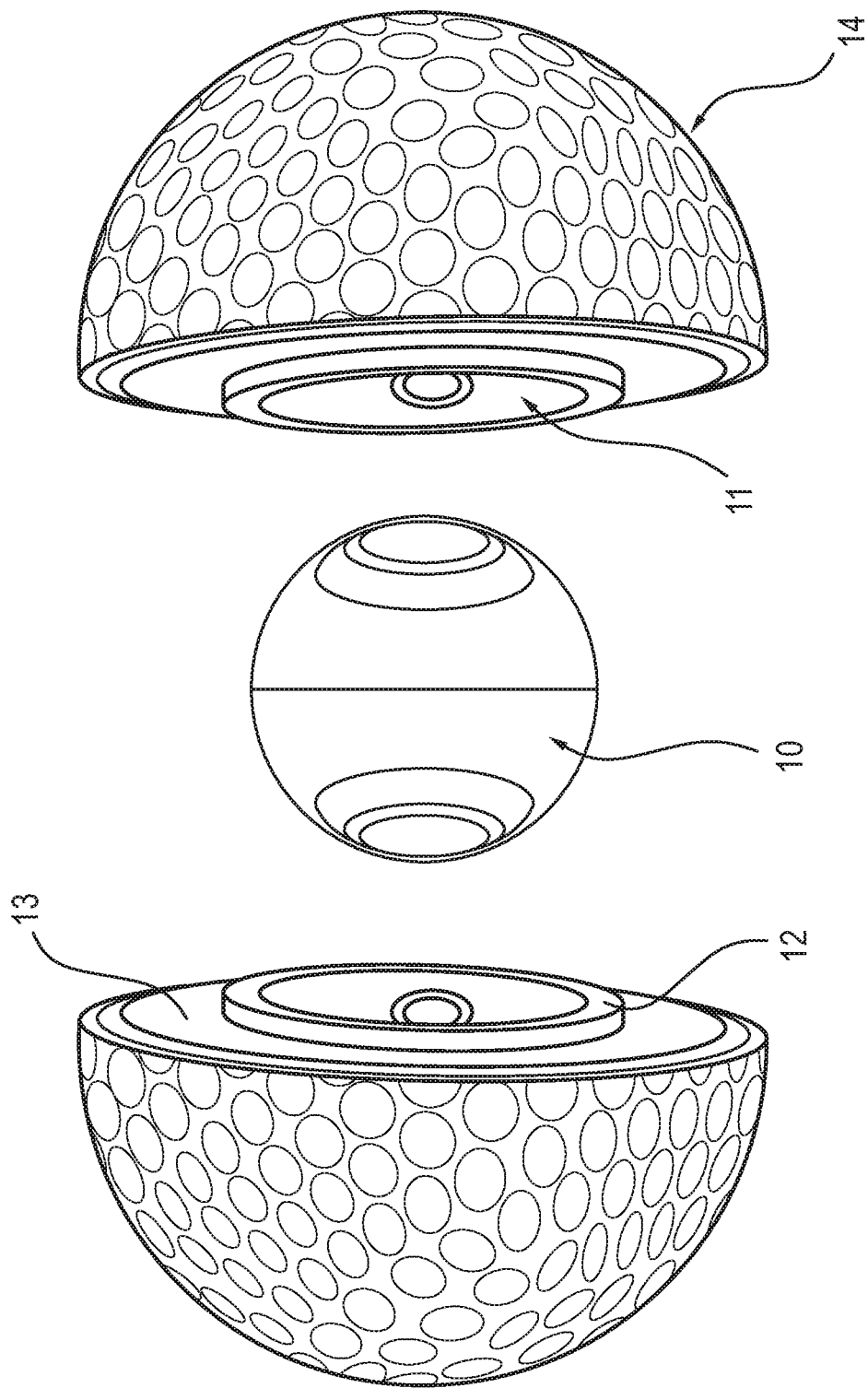
FIG. 1: shows an exemplary depiction of an opened golf ball according to the system according to the invention.

The invention will be described in detail hereinafter on the basis of the overall system for locating a golf ball. The system thus offers a technology platform that can be integrated into existing manufacturing processes, for example for golf balls. However, all other sports with ball game devices (in which a ball is hit) are also possible. The platform communicates wirelessly with a smartphone app and enables the detection and display of information, such as the starting position of the ball, position of the golf ball after having been hit, inclusive of visual and acoustic locating possibility, flight and rolling path of the hit ball, angle of contact, speed of contact, movement curve of the player, scorecard functions, and statistics and analysis for improvement of the individual playing abilities.

In summary, the position of the golf ball can be localised in that the golf ball determines its current position via a GPS module contained therein and transmits this via a transmission path, in ideal conditions of up to 5 km, to a base station, also referred to hereinafter as a "black box". The black box can buffer the data and can forward it via a radio link, for example Bluetooth, compatible with a user terminal, for example smartphones, smartwatches, fitness watches and wristbands, data glasses, VR glasses, wearables, smartclothing and further mobile and stationary (EDP) devices, such that these devices are able to receive, store, process, display and evaluate the data.

The overall system formed of golf ball, black box and user terminal primarily increases the playing enjoyment of the user by reducing the potential for frustration. This is achieved on the one hand in that the golf ball can be easily and accurately (<1 m) localised via an app for smartphones, smartwatches or other wearables and smartclothing, even over large distances. Immediately once a player has teed off and the ball has rolled to a stop, said ball visually transmits the position determined via GPS to the golfer. The golfer thus knows, still at the tee, where his ball is located, whether it is located outside the playing field as the case may be, whether he should hit a second, provisional ball, how he will quickly reach his ball without searching, and which clubs he should take with him for the next shot. In this way, the speed of play is also increased, waiting times for all players are reduced to a minimum, and golf clubs and golf course managers can record a higher throughput and thus increased turnover. Regardless of this, the ball will still become lost only in exceptional cases, for example when it is in an area blocked off from the golf course, such as a biotope. Although the initial acquisition costs are higher, the amortisation is quick. On average, a single handicapper loses 32.5 balls every year, and beginners and advanced players lose up to three times as many. For golf course managers, the possibility of being able to help the owners of lost balls find their balls again can also be provided. Thus, the balls found for example by the golf course maintenance workers can be returned to the owners, possibly in return for payment of a small fee.

By means of further associated services, the focus is directed even further towards the game, and the enjoyment of playing is further increased. The electronic scorecard automatically counts the required strokes, and numerous evaluations of the game data and statistics allow the player to identify his strengths and weaknesses, train in a targeted manner, and compare and measure himself against other players.

Besides the data ascertained via the golf ball, the black box and the smartphone, further accessories, for example hardware fastened to the club or golfing glove, will also determine data and make it available for these statistics and evaluation, for example:

club, player, arm and hand movement during upswing and during tee off/downswing club (head) speed during upswing and during tee off/downswing, and at the moment of contact timing of upswing and tee off/downswing tee-off angle of club, club head and ball at the moment of contact club plane hand plane hand speed during upswing and tee off hip rotation during backswing and downswing.

The detected data is made available in a relational database. Both evaluations, also in graph form, which the user obtains prefabricated via templates, and individually tailored evaluations, based on particular data and evaluation models, which the user can define himself and can compile according to his personal requirements, are thus made possible. On the basis of the user's statistics, tips from professionals are transmitted in an automated manner and at a suitable moment in time in order to advise the player in a targeted manner and in order to recommend and explain exercises for improvement. A service on the basis of which the user can transmit his data as a dataset in text form or video recording, said data being evaluated by golf professionals, such that personalized training instructions, also in the form of videos, video telephony or video teaching, can be provided in return is also possible. Furthermore, it is conceivable that the golf player, based on the input of his sporting equipment, for example his golf club, receives recommendations for correct selection of his sporting equipment, for example an optimal golf club, on the basis of special data analytics software in combination with the data of the game device, for example the golf ball. The aforementioned data, for example also temperature, air pressure, air humidity, wind speed, can be included in the data analytics.

The individual components of the system will be discussed hereinafter. The discussion shall start with the hardware design of the golf ball, which consists of an outer casing and a one-part or multi-part plastics material core, wherein the inner core consists of an impact-, pressure- and preferably heat-resistant material, in which the electronic components contained therein are incorporated. The material and the composition of the components is selected such that the object is resistant to the massive forces acting on the ball. At the same time, the material and composition allow all desired properties, such as locating accuracy, rechargeability, >300 m communication distance, antenna design.

The finished golf ball as well as the object contained therein satisfy the rules forming the basis of the sport of golf, for example minimum diameter, maximum weight, unique ID/visual marking for recognition. If the object is integrated in a ball, it has no negative influence on the flight or rolling properties of the ball. The object can be integrated not only in golf balls. It is also suitable for numerous further kinds of sport (involving the hitting of a ball) and for integration in other game devices.

By means of the sensors contained therein, the object is capable of detecting and transmitting a large amount of data, primarily tracking data (location and movement data as the case may be). The focus here is not only the recording of the player's own style, the automatic compilation of comprehensive game statistics including possibilities for comparison with other players, and the simple finding of the golf ball, but rather the selective complex evaluation of the game data in order to identify the strengths and weaknesses of the player and in order to provide targeted training, and advice based on retrospective statistics and current conditions, for example for selection of the correct club for the upcoming stroke on the basis of the anticipated hitting distance and distance to the (intermediate) target.

In order to protect the electronic components, the core has a particular structure. The components are moulded in synthetic resin, thus resulting in one (or more) harder/inner core(s) and one or more soft outer core(s). The specific challenge lies in developing a resistant core that on the one hand sufficiently protects the integrated components and on the other hand enables a balanced resilience of the golf ball, such that the ball can still be comfortably played. This is achieved by one or more layers/cores mounted around the core. The golf ball is closed by the typical outer casing made of plastics material.

The effective forces are also counteracted in that a plurality of small multi-layer circuit boards are layered one above the other. The diameter of the core is thus as small as possible and acts positively on the damping of the effective forces. The structure also offers improved results with regard to the shielding of RF interference.

In addition, the transmitting/receiving power of the incorporated electronic components must be sufficiently ensured. An additional supporting structure or "framework" made of glass fibres or a lightweight, solid metal such as titanium is also conceivable. In order to enable good signal transmission on the one hand and good playability of the golf ball on the other hand, the components are arranged in the ball in a specific way. FIG. 1 shows an exemplary depiction of the golf ball structure, which for improved clarity has been cut open into two halves.

From the inside out, the golf ball consists of the electronic object or the electronic core 10. Battery shells 11 or batteries adapted to the shape of the core 10 are placed around the core and are in turn surrounded by an antenna outer casing 12. The outer casing 12 is protected by one or more shells 13 preferably made of hard rubber, synthetic resin and/or plastics material. The golf ball outer skin is formed by the conventional plastics material shell 14.

All components of the electronic core 10 and the battery shells 11 and the antenna structure of the outer casing 12 are arranged on the basis of their weight so as to obtain a good weight distribution. The model of weight compensation can provide that the batteries 11 are mounted at the top and bottom in the core, with a framework made of e-technology components 10 located therebetween, with a casing 12, on which the antennas are mounted, being placed externally around said batteries.

The electronic core also comprises a microcontroller with firmware executed thereon in order to control the recording of data and other functions (data transmission) of the golf ball. An internal memory for data storage or buffering is also provided. Further components of the electronics are a charge controller for the battery 11, a charging logic, induction coils for the wireless energy transmission (receivers) for charging the battery 11, a voltage regulator, an RF receiver/transmitter (radio module) for data communication with the black box, an RF antenna and GPS antenna, and a GPS receiver. The GPS receiver can at the same time include an acceleration sensor and/or gyroscope, however these can also be integrated into the electronics as separates sensor(s). The gyroscope is used to calculate the flight trajectory and spin and can be contained in the accelerometer (6-axis accelerometer).

The composition of the core additionally provides that the GPS receiver and the RF radio transceiver share the antenna. The small amount of space in the core is thus utilised to the best possible extent, and interfering signals or dependencies on a plurality of antennas are reduced to the greatest possible extent. The cooperative use of one antenna is possible since GPS and radio are never active in parallel on account of the electronic control and therefore only one component ever uses an antenna at any one time. GPS runs at a frequency around 1.8 GHz, and RF preferably runs in the 868 MHz band (ISM band), and therefore the cooperative use of a single antenna for these two functions is conceivable in principle. The possibly weaker antenna power of the golf ball can be compensated by an improved antenna in the black box, since in the black box there is sufficient space to house a powerful antenna.

For the wireless energy transmission for charging of the battery 12, there is additionally a separate antenna provided. It is conceivable that the ball contains a plurality of antennas of the same type, for example mounted on the upper and lower hemisphere, so as to ensure the best-possible transmitting and receiving quality for the communication regardless of position, and so as to ensure an efficient energy transmission for the charging process.

The antenna is mounted on a hemisphere 12 and thus has the shape of a hemisphere. Here, the antenna itself can be a hemisphere or a sphere or can be a pattern applied to a sphere 12 (spherical circuit board with antenna located thereon). A conceivable production method lies in manufacturing glass-fibre-reinforced hemispheres for example from polyester or epoxy resin. These are treated on one side with a conductive material (for example palladium doping) and are then provided with an electrolytic copper plating. An etch-resistant pattern is then applied by means of pad printing, and then the unnecessary copper is etched away. Alternatively, the doping could be performed already by means of pad printing, and the shape could be constructed directly in a single step. The finished part could then be coated again with glass-fibre-reinforced synthetic resin for further protection, or could be directly moulded.

Alternatively, the antenna structure could be milled out of the hemisphere 12, also using a 5-axis CNC miller, or could be produced by mechanical lamination of a copper layer, for example by deep drawing methods.

Figure 2:
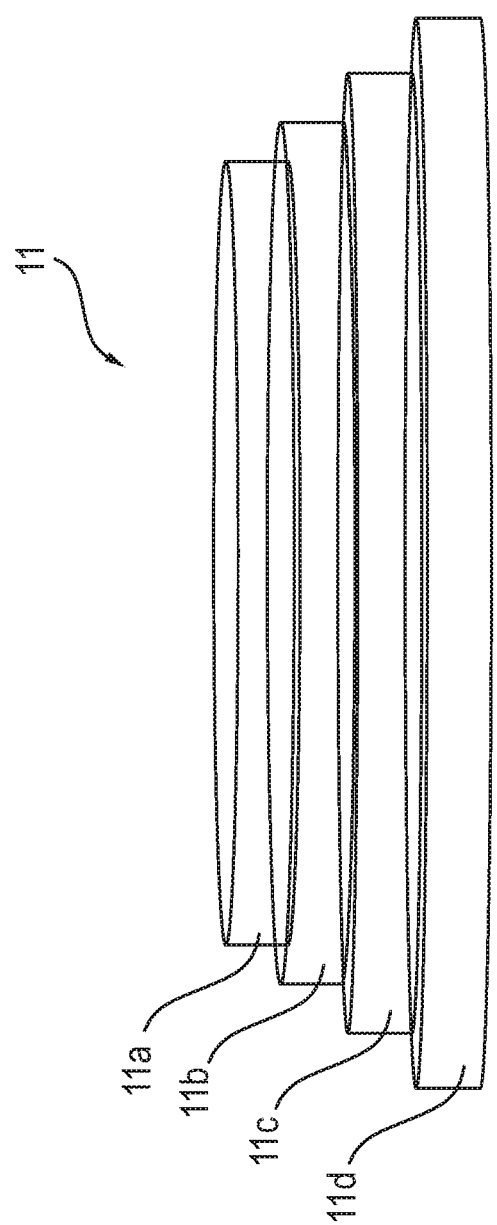
FIG. 2: shows an exemplary depiction of the battery structure of a golf ball, FIG. 3; shows a side view of the mobile charging station according to the invention.

A battery 11 of the FLCB type (FPC lithium-ceramic battery) is installed as battery 11 in the golf ball and contains a lithium ceramic solid-state electrolyte. It is characterised by a high resistance (resistant to impact, stabbing, cutting, vibration and heat), good formability (can be rolled and bent), a low weight and/or a good energy density (approximately 1.5 g for 45 mAh). With regard to the shape factor, the battery 11 is based ideally on the shape of the ball (for example hemispherical). This is implemented for example in that the individual layers of the battery 12 are produced, stacked and laminated in the corresponding shape. An example of a battery 11 constructed in this way can be seen in FIG. 2, which shows a heavily simplified depiction of the conceivable battery shape factor. It can be seen that the battery 11 consists of individual stacked layers 11$a$, 11$b$, 11$c$, 11$d$, which together form the characteristic hemispherical shape. The battery stack 11 consequently consists of differently shaped "layers" 11$a$, 11$b$, 11$c$, 11$d$.

The golf ball can optionally contain a light sensor for optical communication between the black box and golf ball, provided the regular data transmission by wireless energy transmission is not possible.

The basic functions of the golf ball are as presented hereinafter. As has already been mentioned, the system comprises a black box which is also suitable for receiving a golf ball and for charging the battery 12. The player can easily place the golf ball in the holder of the black box, whereby said golf ball is automatically held by the black box and autonomously aligned, such that it assumes the best-possible position in the black box for the purpose of charging and communication. To this end, the golf ball and the black box comprise corresponding elements, by means of which an alignment of the golf ball for optimised positioning and communication in the black box is made possible. The process functions fully automatically as soon as the user places a golf ball in the holder of the black box, for example via magnetism or a special mechanism for fixing over the surface, for example by means of a clamping bracket.

Wireless charging of the ball with simultaneous high energy efficiency is achieved by a particular arrangement of the receiving coils. Close-range transmission with (resonant) inductive coupling is used. By way of an internal lighting means, the golf ball can be illuminated and the current charge status can be output. As soon as the golf ball has been placed in the charging station, all functions of the golf ball (radio, etc.) are deactivated and the golf ball is automatically charged. During the charging process, the state of charge pulses, such that the charge status is signalled, possibly by way of colours: red-yellow-green. Following complete and successful charging, the state of charge indicator is extinguished.

The functions of the golf ball, i.e. data recording, are automatically activated as soon as said golf ball is removed from the holder. The activation is implemented by the black box via the charging coils. It is also possible to switch the golf ball on and off by way of an app on the user terminal. The "switching on and off" of the ball is implemented without haptic switches of the golf ball and for energy reasons without use of the RF receiver of the golf ball.

More specifically, the process of switching on and off is performed as follows. By way of a sensor/switch or mechanism mounted in the golf ball holder, the black box identifies whether a ball has been placed in the holder and sends a ping via the induction coil to the golf ball. Alternatively, the black box in the switched-on state can emit a ping via the induction coil every x seconds. If a switched-off golf ball receives a ping, it is activated and sends feedback including information regarding identification, state of charge, etc. to the black box by RF. The black box therefore knows, among other things, which golf ball is placed in which holder. Once this information has been sent, the golf ball can deactivate itself again automatically. An activated golf ball that has just been placed in a holder therefore sends the aforementioned information once after it has been placed in the charging station and then deactivates itself autonomously.

The golf ball records numerous data during use, and buffers it so that it can be exchanged between the golf ball and black box. Individual items of data are already processed or prepared beforehand as appropriate. The recorded data includes the following:

geo-coordinates before movement geo-coordinates after movement (if the ball has not moved for >2 seconds)

geo-coordinates during movement (every 0.X seconds acceleration speed (Vmax, ball flight speed, ball rolling speed)

distance covered flight path: distance from the point at which the ball is struck until first contact with the ground flight trajectory/height flight line/rotation/spin rolling distance: distance from point of first contact with the ground until standstill spin/rotation during rolling state of charge of the battery in the golf ball horizontal position on a slope (downhill, uphill) inclusive of angle calculation of the "net" striking distance: calculation of differences in height between the starting point and end point and calculation of the striking distance in a plane, inclusive of flight distance and rolling distance. Consideration of the values for example when proposing a club for the next stroke by context of retrospective statistics and current conditions, such as terrain, weather, etc.

The golf ball transmits the data, after recording, to the black box by RF, even over large distances, said black box then receiving and buffering the data. There, the data can be called up for example by the smartphone. The golf ball, in the switched-on state, after any change to its position thus ascertains its new position prior to the first tee-off stroke and following each subsequent stroke and makes this information available to the black box and the smartphone. The position is displayed via a map of the hole currently being played, such that the user can immediately identify where the ball is located. Besides the position of the ball, the distance between user and golf ball, and also direction are also displayed continuously via an arrow. The user is thus navigated comfortably to the golf ball.

The navigation to the golf ball is optionally possible also without a smartphone, via an additionally obtainable LCD display of the black box or transmission of the data to a smartwatch, smartclothing, data glasses or other wearable.

Alternatively, the golf ball can obtain position information from the black box so as to enable a quicker determination of the position of the golf ball in the case of a cold start thereof. In order to enable the accuracy of the locating, even in poor conditions, what is known as a dead reckoning can be used by means of optionally integrated gyroscope and accelerometer of the golf ball. Dead reckoning is the continuous approximate determination of the location of a moving object on the basis of its direction of movement (course) and speed (travel). A combination of dead reckoning and GPS is used. On the basis of the last position, the data from accelerometer and gyroscope are then correlated with one another if the components deliver reusable measured values. In this way, a more accurate evaluation of the movement and a determination of the position following the movement can be made possible.

The golf ball has firmware enabling use of the installed sensors and components in the most energy-efficient manner possible so as to ensure the longest possible battery service life. On the one hand, the golf ball is automatically activated if it is removed from the switched-on black box. The firmware is additionally able to distinguish between changes in position of the golf ball as a result of said ball having been struck and changes in position for example due to the golf ball being carried, and can thus identify autonomously a new hole/a new tee off. Once the ball has been struck, the accelerometer identifies the standstill, and the golf ball transmits the recorded data inclusive of a checksum to the black box by RF. Following successful data transmission, the golf ball receives a confirmation of the checksum from the black box, and the golf ball then switches into the standby mode. The RF receiver switches into receiving mode, whereby the golf ball can be reactivated by the black box. The GPS is deactivated, but is not switched off, and can be reactivated within 100 ms. An optional accelerometer and an optional gyroscope remain active. As a result of the next movement (stroke), the golf ball is woken up again and starts once more with the recording of data (GPS, accelerometer, gyroscope).

If the player does not find the golf ball at the position indicated on the app, this would appear to be a problem related to the localisation of the golf ball. In order to perform a new localisation, the user can wake up the golf ball via the smartphone app. To this end, the app sends a command for activation of the golf ball, and the golf ball is activated (power: on). The app can then send a command for renewed localisation to the golf ball via the black box. The golf ball then ascertains its position by GPS and transmits the recorded data by RF to the black box (inclusive of checksum). Following successful data transmission, the golf ball receives a confirmation of the checksum from the black box, and the golf ball then switches into the standby mode, as described above. The user obtains the new position information of the golf ball on the app and can find the ball. The process can be repeated in the event of any problems.

In accordance with an optional auxiliary function, the golf ball can also contain a mobile communications module. The golf ball can thus send the data, after recording, by means of an integrated GSM module (SIM card, eSIM) via a mobile communications network to a central server, which receives and buffers the data. There, the data can be called up by the smartphone immediately after it has been transmitted from the golf ball. If the data has been successfully transmitted into a cloud, it is removed from the golf ball. In this case, the black box no longer needs to be used as a bridge between golf ball and smartphone.

In addition, the golf ball can comprise possible lighting means, in particular LEDs, whereby said lighting means has an active luminosity as required so as to be able to easily retrieve the golf ball even in twilight or darkness. To this end, the player can select the twilight mode in the smartphone app, and the golf ball starts to illuminate permanently or for a defined period, for example for 5 minutes, after having been struck. For energy-saving reasons, it is conceivable to provide a flashing light, which can be activated by the smartphone app and which flashes the ball 5 times for 0.5 seconds.

The golf ball can additionally have different status LEDs in order to be able to check the most important status directly at the golf ball. By shaking the golf ball, a status display (coloured illuminating LEDs) can be triggered. For example, these can provide a red-yellow-green display of the state of charge of the battery (depending on the status), a display of the connection to the black box (OK blue, otherwise off), an indicator of the connection to the GPS satellite (OK white, otherwise off). The outer casing of the golf ball is additionally printed such that the illuminating LEDs are labelled and can thus be associated with the corresponding status.

In addition, the golf ball can have a loudspeaker, by means of which acoustic signals can be provided, which are intended to assist the player in finding the golf ball. If the user fails to find the golf ball in spite of transmission of the correct position, for example because the ball is located under leaves or in high grass, the user can trigger a sound signal from the golf ball by the smartphone app in order to locate the ball acoustically. Integration of a temperature sensor in the golf ball is also possible so as to be able to communicate the current external temperature to the player. The temperature is measured and recorded continuously (every x minutes). The function can be provided either by reading out the temperature of the electronic components in the core of the golf ball or via a temperature sensor are integrated separately in the golf ball.

By suitable material selection and/or outer surface coating, the golf ball additionally can be capable of floating. Special golf balls for water obstacles can thus be produced, which golf balls for example are lighter or larger than normal golf balls and are thus capable of floating. The software of the server or of the black box enables a simple swap of the ball during play, optionally even only for the stroke over the water obstacle, such that the player does not have any appreciable disadvantage on account of the lower weight of the ball capable of floating.

Components of which the density can be varied in order to achieve the capability of floating are the battery and the moulding materials, which are available in all possible strengths and densities. Various materials that have a lower density than water are conceivable as moulding materials, such as polystyrene foam material (Styrofoam), aerogel, thermoplastic foamed parts, balsa wood, aerographite, graphene aerogel, and air.

In order to be able to provide the player with haptic feedback, the golf ball can be equipped with a vibration motor. Haptic feedback can be used for example in order to indicate to the player that a golf ball is ready for operation. The haptic feedback consists in the ball vibrating briefly 3 times in succession.

Figure 3:
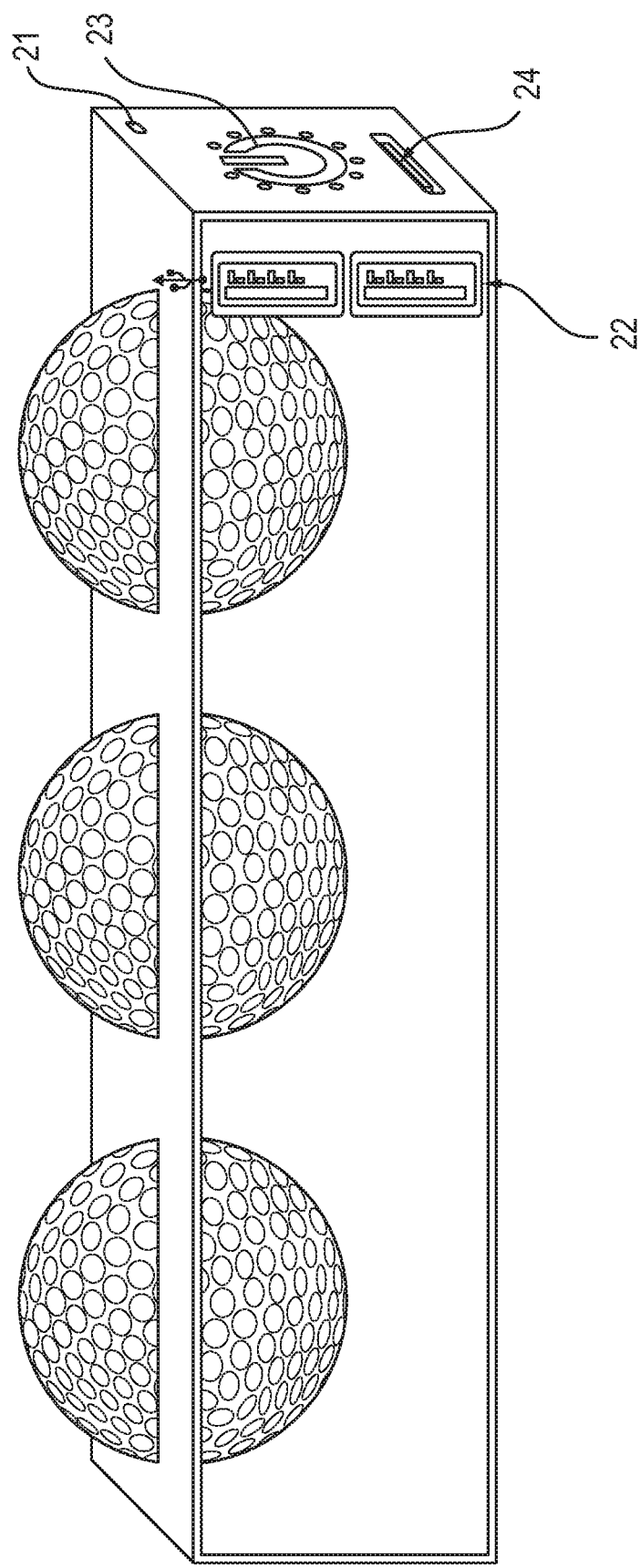
Figure 4:
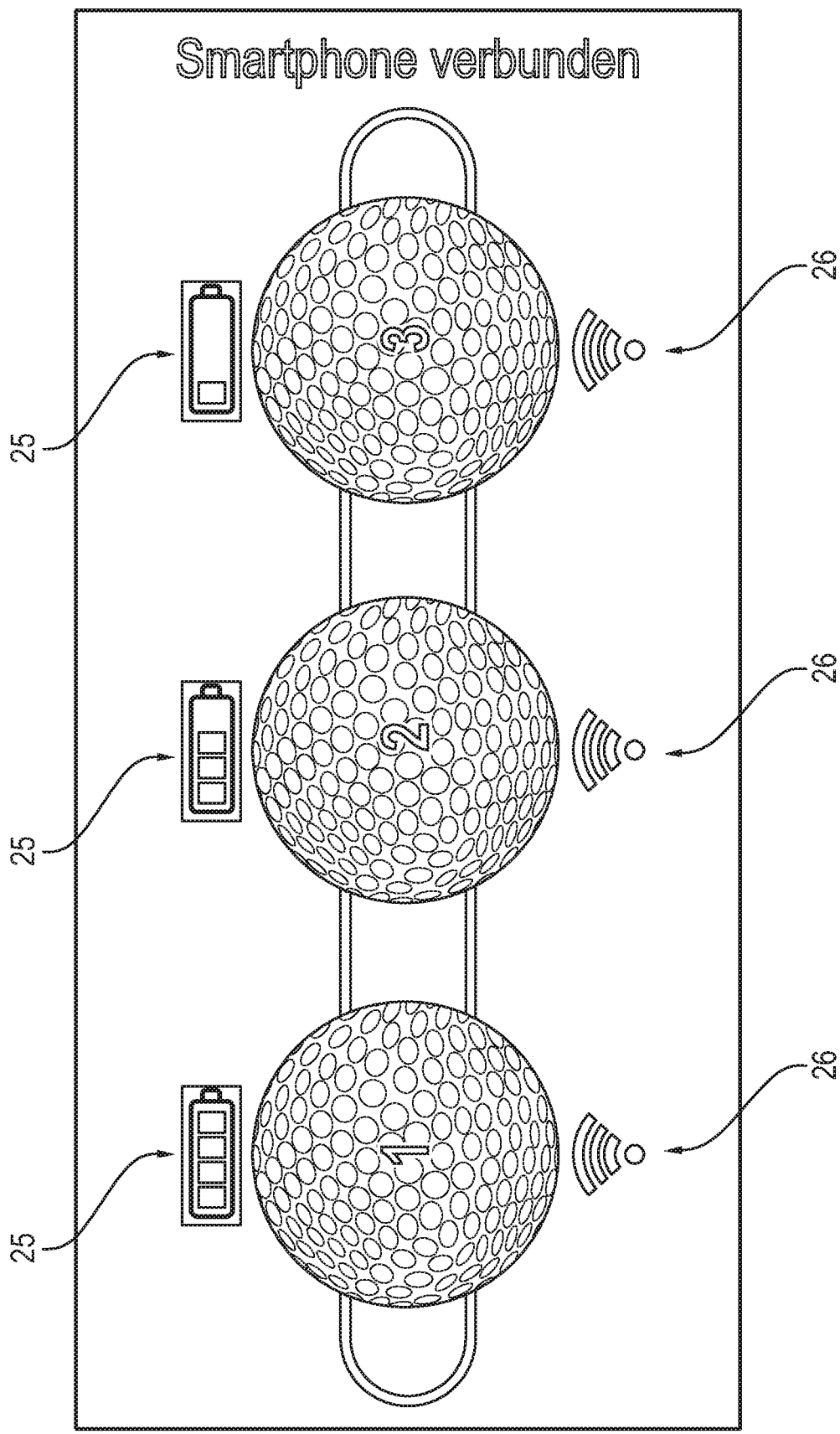
FIG. 4: shows a plan view of the charging station of FIG. 3.

In order to cover the distances conventional in the case of golf between player and golf ball of up to 300 metres, conventional communication protocols such as Bluetooth are insufficient based on the current state of knowledge. In order to increase the communication range and buffer data, a type of bridge or gateway is required. The black box is used as a mobile, wide-ranging intermediary between ball and smartphone (smartwatch, smart glasses or VR glasses, other wearables, smartclothing, etc.) in that it receives the information from the ball by radio in the SRD band, buffers said information and provides it for the smartphone by Bluetooth. For the user, the process offers the currently best-possible user experience and convenience, since the gateway function is of secondary interest for the user, and the numerous auxiliary features of the black box (for example charging function for the smartphone) are of priority. The black box should be suitable for comfortable fastening to the trolley, on/in the golf bag, golf cart or to an item of clothing of the player, or can be part thereof. At the same time, the black box is used to charge the batteries in the balls. The following advantages are thus attained:

sufficiently long distances can be covered by the communication of smartphone ↔ black box ↔ golf ball Bluetooth is compatible with any smartphone; there is no need for a separate dongle on the smartphone the coupling of smartphone and black box by Bluetooth is quick and simple;

devices already coupled previously automatically connect when they are within range Bluetooth ensures stable data transmission in close range Bluetooth Low Energy requires a particularly low amount of energy a plurality of black boxes could communicate with one another by radio (mesh network)

the black box offers protection for the balls and serves as a transport means the black box contains a sufficiently large battery, by means of which the smartphone of the user can be charged during the round of golf FIGS. 3 and 4 show a side view and plan view of the black box according to the invention (mobile charging station). Three golf balls placed in the black box are visible. The black box, for operation, has a reset button 21, a USB interface 24 for charging the internal battery of the black box, two USB interfaces 22 for the connection of external devices in order to charge these, and a power button 23 with status display.

On the upper side, there are located possible status displays 25, which indicate the charge status of the inserted golf balls per holding means. Visual displays 26 are also provided as an indicator for the connection status between black box and golf balls. Details of the black box will be discussed hereinafter.

The main components of the black box include a microcontroller, a local memory, and a rechargeable energy source (battery) inclusive of a plug-in power supply unit for the purpose of connection to mains power. A USB port can be used optionally for charging. The electronics comprise a charging controller (battery) and a charging logic, in particular for energy management and the energy-saving mode, means for wireless energy transmission to the golf balls in order to charge the batteries thereof, voltage regulator, an RF receiver/transmitter (radio module for short-distance radio) inclusive of antenna, and a Bluetooth receiver/transmitter inclusive of antenna in order to couple the black box to a smartphone. One or more USB ports for the connection of external devices to the power source can be provided. USB ports of the conventional types, for example type A, B or C, are used. The fixing and alignment element for the golf ball is a separate element (steel, magnet, etc.), which is contained in the black box, for example embedded in the ball holder, and corresponds to a fixing and alignment element in the golf ball.

The three holding means of the black box fix the balls and at the same time make it possible for them to be easily removed (mechanically or magnetically). The player can place the golf balls easily in the holder of the black box and can align them automatically in order to assume the best-possible position for the purpose of charging and communication. The black box can be charged via a socket/mains power, or via the connection to another suitable energy source, for example an on-board power supply in a passenger vehicle, in the golf cart, or another portable energy store. During the charging process, the black box shows the state of charge and charge status via the display 23. If the black box is separated from the power supply, the display 23 is deactivated.

By touching the power button 23 once, the state of charge of the black box and of the golf balls can be displayed via a status display on the black box. The state of charge of the battery of a golf ball can also be displayed on the black box, for example can be seen on the app, during play or use of said golf ball. To this end, the state of charge is regularly transmitted from the golf ball to the black box. The black box signals a warning of an excessively low state of charge of the golf ball via acoustic and visual feedback, for example an acoustic warning signal 5 times in conjunction with rapid flashing of the state of charge displays of the golf ball in question. The smartphone app additionally sends a warning message and automatically proposes the golf ball having the highest or most suitable state of charge. The state of charge of the black box can also be displayed in the smart app, and a warning of an excessively low state of charge can be provided. Should the battery of the black box no longer have sufficient energy for a complete round once a round has been completed, the user is advised of this and is requested to charge the black box at mains power The player can optionally activate the energy-saving mode via the app in order to start the round nevertheless. Another playing mode also can be selected optionally via the app, in which mode the player determines how many holes he wishes to play, either beforehand or during play.

The pairing of the black box with the smartphone in order to obtain displays of statistics and data on the smartphone is achieved as follows:

Once it has been switched on, the black box checks whether the smartphone last connected is within range. If the known smartphone is found, the smartphone is automatically paired with the black box. Successful connection is displayed as feedback on the black box 21 via the corresponding pairing status LED 21 and on the app. If the pairing is unsuccessful, an error message inclusive of assistance in overcoming this is displayed on the app. Should the black box be unable to detect a known smartphone within range, the black box switches to pairing mode. The player is then prompted to bring the available black box within range of his smartphone. Following selection of the desired black box on the smartphone, the known pairing process begins, and the player is requested to input a verification code on the smartphone. Following successful pairing, the player receives feedback of this as well at the black box and on the app. If the pairing process is unsuccessful, the player in this case as well receives an error message on the smartphone, inclusive of assistance in overcoming this.

In order to put golf balls into operation with the black box, said golf balls must first be connected to the black box. To this end, the golf ball must be inserted into the holder of the black box. The golf ball is automatically connected to the black box and is assigned a unique ID from the black box. Following successful connection initialisation, the black box emits acoustic and visual feedback, for example an acoustic signal (positive triad or the like) and flashing 3 times of the pairing status display. The golf ball is then assigned to the user account belonging to the black box and is displayed on the app on the smartphone paired with the black box. The smartphone sends a notification of successful pairing, and the golf ball state of charge and charge status display is updated on the black box and on the app.

It is not absolutely necessary to separate a golf ball from a black box. In order to use a golf ball with another black box, it is sufficient to connect the ball to the other black box. The player can also at any time separate the golf balls paired with his black box using the smartphone app. Balls of fellow players can also be connected to the black box. To this end, the player places the golf ball, prior to the round, in a holder of the black box and the foreign golf ball is automatically connected to the black box. The black box checks the ID located on the golf ball and the contained data and, in conjunction with the smartphone app and a comparison with a central server system of the platform, identifies whether the ball is already assigned to a player account. If the foreign ball is already assigned to a foreign player account, the smartphone app displays the player account of the fellow player, and the player can add said fellow player to the round of golf. The player additionally has the possibility to reset the foreign ball and to reassign the ID. All statistics are detected during the course of play via the player's smartphone and are transmitted to the central server, such that the fellow player also has access by means of his smartphone to the data during play.

If the foreign ball is not yet assigned to a player account, the player can choose between two modes. The player can invite a player registered on the server explicitly by specifying an identification feature of the fellow player (for example his email address registered on the server), and the ball can then be allocated to the specified account belonging to the fellow player and both players can monitor the statistics. Alternatively, the ball can also be incorporated without specification of user data. The game data are still determined and recorded for generality/basic statistics. Once the game is over, the player can send the data to the fellow player by specifying the email address of said fellow player. If the email address is already linked to a server user account, the fellow player can add the data directly to his account. If the email address is not yet linked to a server user account, the fellow player will receive an invitation email. If he clicks on the confirmation link, his customer account will be processed and he will be requested to specify his password and master data in the browser. Following successful input of this information, his customer account will be set up and he will be able to see the statistics.

The player will receive a message on his smartphone if he finds a foreign golf ball currently in play at this time and places it in his black box. The black box can check the ID on the golf ball and thus determine that the ball is not allocated to the player. As a result of the server connection, it can additionally be determined whether the golf ball is currently in play. This can be signalled to the player and a request output to replace the ball where it was found, possibly inclusive of an assist, so that the ball is placed back at the original location. If the found ball is no longer in active play, it is deemed to be lost and is connected to the player's black box.

Information regarding available firmware updates are also presented to the player in the smartphone app, wherein updates of the firmware of the golf balls and the black box can be downloaded in order to then be installed. The smartphone app can write to the black box or program it. The black box can write to the golf balls or program these. The player receives feedback via firmware updates for golf balls or black box in the smartphone app and by email. The software update can then be loaded onto his smartphone by means of the app, and the request to install the updates is displayed when the black box and smartphone are next paired. Here, the player is given the choice to perform the update immediately or later. The notification regarding installation of the update is displayed again following the next round of golf As already discussed previously, the black box can assign a unique ID to each golf ball in order to identify it unambiguously. Here, a variable ID is assigned to each ball by the black box. Each ID is unique, and the golf ball thus can be identified unambiguously. The assigned ID is compared in the background with a central server via the smartphone. Each ball registered previously at least once can thus be assigned to its owner (also historically retrospectively). The current ball is selected by placing it in the black box and transmitting data by means of the wireless energy transmission. In contrast to the radio transmission, this is selective since the range is only 1-2 cm.

The black box can connect to one or more golf balls via RF so as to be able to communicate wirelessly with the golf balls bidirectionally over a large distance. Radio Frequency: ISM band (for example 868 MHz band=863-870 MHz, frequency bandwidth with a plurality of channels accordingly), that is to say the ranges in which radio transmission occurs without additional authorization and data can be transmitted. The 868 MHz band can be utilised worldwide. Interference or problems occurring possibly as a result of a high density of radio devices on account of frequency overlaps (as can occur for example in urban areas) are not anticipated on golf courses. Under laboratory conditions, ranges up to approximately 1000 m are achieved. The following is true in principle: the lower the frequency, the greater is the range, but the larger is the antenna with uniform energy efficiency (small antenna possible, but more energy required, range then likely reduces). Communication with a number of balls is possible simultaneously (purely a software function).

The black box and the smartphone can be paired with one another by Bluetooth so as to enable wireless bidirectional communication compatible with any smartphone. The black box thus serves as an intermediary/interpreter between the golf ball (RF) and smartphone (Bluetooth).

The game data should also be recorded if the smartphone of the player is not connected to the black box. For this purpose, the black box receives data from the golf ball and buffers it in an internal memory. The player can read this data later from the black box by pairing for example the smartphone by Bluetooth.

In some circumstances it is desirable to reset the golf balls. To this end, the player can press a reset button 21 of the black box or in the smartphone app in order to reset the software of the golf balls to the delivery state.

The black box offers assisted GPS for quicker and more accurate position determination of the golf ball via position information of the smartphone. To this end, the black box can send position information of the paired smartphone to the golf ball in order to enable a quicker determination of the position of the golf ball in the event of a cold start thereof.

Additionally or alternatively, the black box can receive the A-GPS auxiliary information of the GPS module located therein at regular intervals and can thus determine its position. It forwards this information once connected to the paired golf balls. These can therefore perform their own position determination more quickly and more accurately. A smartphone is not required in this case for assisted GPS. Should a paired smartphone be present, however, the A-GPS data thereof is likewise read out and matched with that of the black box. In this way, the best-possible result of the localisation is attained and forwarded to the golf balls. Once connected, the black box receives the A-GPS auxiliary information from the paired smartphone and forwards it to the golf ball. The golf ball can therefore perform its position determination more quickly and more accurately. During the course of play, a regular comparison of the A-GPS auxiliary information from the paired smartphone and the position information from the golf ball can be performed in order to increase accuracy. This is expedient just before each further stroke outside the green of a hole, since the golf ball, black box and smartphone are arranged rather close to one another at this moment in time.

The player can also use the battery of the black box to charge other devices, such as his smartphone. The black box has a comprehensive energy store, which is dimensioned such that, besides the charging of the black box and operation during play, it also offers the possibility to supply energy to further devices. The player can connect these devices to the black box via the USB ports 22, which devices are then automatically supplied with energy, provided the black box is switched on. Here, the black box is configured such that it never delivers more energy than that anticipated to be required as a minimum in order to complete the current round of play. A running time of up to 6 hours is assumed for a player to complete a full round of play. Energy ceases to be delivered to connected devices before the state of charge of the battery of the black box drops below the energy level required for the (remaining) round of play.

The player can activate an energy-saving mode of the black box if the black box no longer has sufficient energy for a complete round. In the energy-saving mode, the communication between golf ball, black box and smartphone is reduced to a minimum in order to consume as little energy as possible, yet still record all data. The player can also specify how many holes are still to be played, so that the black box can calculate whether there is sufficient energy available for this. Before a game is started, the player can specify how many holes he would like to play. During play, following notification by the black box that the energy reserves are no longer sufficient, the player can specify how many holes he would still like to play. Alternatively, he can switch into the energy-saving mode.

The black box can additionally provide further auxiliary functions. On the one hand, the black box can be charged via a battery belonging to a golf trolley. The black box can be connected by cable to the battery of a golf trolley in order to use this battery instead of a mains supply in order to charge the black box. An adapter cable can be provided for connection to the central battery of the conventional golf trolleys. It is also possible to charge the black box via the battery of a golf cart. Wireless charging of the black box is also possible. The black box contains induction coils, which can be used to charge the black box. The user for this purpose merely has to place the black box on a charging device for wireless energy transmission, and the black box is automatically charged. Of course, the black box can also be connected to any further energy source by cable and charged in this way. Here, portable energy sources/power packs, which are known from smartphones, are meant in particular.

It is desirable for the recorded game data to be sent to a server even if there is no smartphone connected to the black box. The black box can optionally transmit the received data, once this has been recorded, to a server via an integrated GSM module (SIM card, eSIM) via a mobile communications network, which server then receives and buffers the data. There, the data can be called up directly from the golf ball by the smartphone following the transmission. If data have been successfully transmitted into the cloud, they are removed from the black box. To this end, the player must provide the black box with a data tariff, and the black box sends the data into the cloud via a mobile communications network. The player can call up the data from the cloud for example by the smartphone app immediately after the transmission by the black box or at any other moment in time.

Recorded game data can also be written to an external, mobile memory medium. The black box receives the data from the golf ball and buffers it. The player can insert a USB stick into the USB port of the black box, and the black box transmits the recorded game data to the USB stick. The game data can be deleted from the black box only via the smartphone.

The black box can connect to other black boxes located within range in order to optimise the range between golf ball and black box by establishing a mesh network of black boxes. Black boxes located within range of one another can communicate with one another by RF and connect to each other. Transmission paths over larger distances can thus be established. Should the golf ball of a player not be able to communicate directly with its black box, the communication can take place via the black box located next closest to the golf ball. This black box receives information from the player's black box that the ball is out of range and can then receive the data from the golf ball and forward it to the other black box.

In order to be able to evaluate the stroke even more precisely by the app, the stroke noise, i.e. the sound as the ball is struck, is recorded by a microphone integrated in the black box and is made available to the smartphone app for evaluation. The combination of flight trajectory, flight curve and sound at the moment of impact enables a precise evaluation as to how the ball has been struck by the head of the club (front, middle, top, bottom, rear) and in combination with the flight data of the golf ball enables an accurate analysis for the purpose of evaluating any abnormal behaviour as the ball is struck.

The player can "check in" player actions in the smartphone app before or after a recorded stroke so that said actions are included in the statistics and evaluations. These actions can also be allocated to the statistics via hardware buttons located on the black box as a result of the user pushing the buttons. The black box then assigns the action to the appropriate ball and stroke. A successful check-in is confirmed by a discreet sound signal and flashing of a status LED in the button and is then immediately visible on the app.

The actions include:
whiff stroke (stroke counts)
penalty stroke
ball out of play
provisional ball: player plays a second ball because he is unsure whether the previously played ball can still be played.

previously played ball is played on: provisional ball is automatically removed from the game provisional ball is played on: previously played ball is automatically removed from the game and a penalty stroke is added In principle, the user can "check in" actions by way of the app by selecting the desired option during play.

The player can additionally "check in" golf equipment, in particular golf clubs, before playing a stroke, so that this equipment can be included in the statistics and evaluations. In principle, the user can "check in" clubs by way of the app by selecting the desired option during play. For reasons of accuracy, usability and user experience, a combination of hardware and software check-in is performed. The hardware check-in functions automatically, without the player having to be active. Before play, the user fastened special tags to the head of each club handle. These tags contain a specific technology (NFC, RFID, UHF, possibly HR/RF) and a unique marking (for example i7 or iron 7) so as to be able to be assigned to the correct club. If the player removes a club from the bag, the black box identifies the club taken from the bag on the basis of the changing transmission strength of the tag on the removed club and automatically assigns the following stroke to said club. If the player removes a number of clubs at once, the app identifies which club belongs to which stroke on the basis of game data and context.

The player can attach his smartphone to the black box so that it is always ready to hand during play. A holder secures the smartphone firmly to the black box during transport over the golf course. A charging function is offered optionally. The smartphone fits here seamlessly into the design of the black box and can act as a display of the black box.

For players who wish to have a presentation of further functions on a display which is not the smartphone, a convenient mini tablet can be offered, on which the app is installed. Special editions of the black box including a holder for a specific tablet could be offered in cooperation with tablet manufacturers. An external display can be connected to the black box so that the app can be used without a smartphone.

In order to be able to portray the user surface of the smartphone app, a device much more complex than a monitor is necessary. The presentation on the external monitor is based accordingly on easily presentable status information on a simple display:

scorecard (number of strokes, sorted by holes)
distance from the ball including navigation to the ball, similar to old navigation systems including specification of the distance and direction arrow.

In the case of official competitions and tournaments, the use of electronic aids which offer an advantage over other players is prohibited. This system can be used without smartphone by activating the tournament mode. The golf ball and black box continue to record all data, but the player cannot use this data during play. Merely the scorecard is shown on the display.

The black box can optionally be directly connected to a WLAN so that it can communicate directly with the server system in the cloud if there is an existing Internet connection in the WLAN. Once the received data has been recorded, the black box transmits said received data to a server via an integrated WLAN module as soon as the black box enters the range of a connected WLAN, connected to the Internet, which server receives and buffers the data. There, the data could be called up immediately by the smartphone after the transmission from the golf ball. If the data has been successfully transmitted into the cloud, it is removed from the black box.

The basic functions of the smartphone app will be briefly summarised hereinafter. The app offers a display of golf courses in the vicinity of the user, in particular
- map and list view
- number of holes, including maps
- course handicap
- costs (green fee, training facilities)
- contact data In addition, player profiles can be managed and displayed. A profile comprises the following information:
- first name, surname
- profile picture
- email
- handicap
- course handicap
- tee (colour)

Information regarding the form of play can also be managed, wherein the following options are provided:
- match play
- stroke play
- Stableford play
- play against par
- Texas scramble The app additionally offers a display of the position of the golf ball on the map, in particular with the following information:
- map of the current hole including basic information
- length of the hole
- par
- current number of strokes
- display of the position of the golf ball
- display of the position of the flag
- detailed view selectable
- distance from the front of the green
- distance from the middle of the green
- distance from the back of the green
- distance from the flag
- connection between two points with displaceable target point
- display of the distance between golf ball and target point
- display of the distance between target point and flag The data analysis and data processing of the received ball data provides the following information:
- (model for calculation of flight curves, statistics)
- filter criteria for statistics
- strokes (one or more)
- round (all, last, last 10, last 20, etc.)
- course (all, last, specific)
- distance from the target
- position (tee, fairway, sand, rough, other)
- score (par 3, par 4, par 5)
- stroke type (putting)
- From the tee
- fairway hit (%)
- miss to the left (%)
- miss to the right (%)
- typical stroke length (m)
- Green played
- closer than 15 m to flag (%)
- too short (%)
- miss to the left (%)
- miss to the right (%)
- too long (%)
- Scoring
- condors (%)
- albatrosses (%)
- eagles (%)
- birdies (%)
- pars (%)
- bogeys (%)
- double bogeys (%)
- +3(%)
- +4(%)
- Comparison
- comparison of the values with other players, divided into
- global
- continents
- countries
- regions
- courses
- friends
- Stroke analysis
- analysis of the individual strokes with regard to insights (hook, slice, etc.)
- proposed practice/training in order to improve playing abilities Processing of statistics for entire golf courses and individual holes of the courses is additionally offered, more specifically inter alia
- provision of player information
- average result
- average handicap
- average playing time
- most difficult hole
- fairways/greens etc. hit
- putts per hole, etc.
- creation of statistics on the basis of certain player profiles The player is also provided by way of the app with navigation of the golf course (position determination, obstacles, greens, flags, holes) and with the possibility of a digital scorecard. The app additionally offers transmission of the data into the cloud (online server), the playing of a number of balls per round (individual player and flight), invitation of players to the round of golf (number of players with one BB, more than 3 balls on BB), addition of players to a round of golf, allocation of golf balls.

The player can already download information relevant for a round beforehand and can use the smartphone in flight mode (Bluetooth activated) in order to be undisturbed. The off-line mode enables undisturbed golf play alongside complete usability of the system, wherein the upload of the game data into the cloud by smartphone is disabled on account of the active flight mode. If the flight mode is deactivated, the user can transmit his game data directly to a server in the cloud.

In principle, the app in most cases can automatically perform an allocation of the club to a stroke by evaluating the stroke data (distance, stroke speed, flight trajectory, spin, etc.) in combination with the context (position in the sand, rough, or on the green). Certain actions can also be detected by the software and allocated, for example ball out of play, ball in a water hazard, or ball in the hole (hole finished). These conclusions, however, can be prone to error in certain constellations (for example use of a 7 iron for a chip-and-run on the edge of the green, use of the putter just before the green, whiff stroke, etc.). The check-in of clubs and actions is therefore also provided by hardware. The combination of check-in by hardware in conjunction with the app results in the best-possible accuracy, usability and user experience. Detected check-ins can then be recognised and edited immediately on the app.

The app additionally offers a series of status displays, in particular a pairing centre with status display (paired, unpaired), charging capacity of the ball, charging capacity of the black box, charge status of the ball, charge status of the black box, pairing status of the ball, status display in the black box (LEDs) and app for state of charge, charging activity, anticipated charging duration, etc.

The invention claimed is:

1. A mobile charging station for at least one ball game device, the charging station comprising:
   at least one internal energy source;
   at least one holding mechanism for holding and fixing the at least one ball game device having integrated electronics, wherein upon holding, the at least one ball game device can be supplied with energy drawn from the at least one internal energy source;
   a first communication module for wireless communication with the at least one ball game device in accordance with a first transmission technology;
   a second communication module for communication with a user terminal in accordance with a second transmission technology, differing from the first transmission technology, the charging station providing a gateway functionality between communication partners of differing communication technologies; and
   a charging logic controller which includes computer readable instructions which when executed cause the controller to:
      identify that the at least one ball game device is placed in the at least one holding mechanism;
      detect a state of charge of a held ball game device;
      start supplying the energy to the held ball game device based on the detected state of charge; and
      indicate, via visual and/or acoustic signals to a user, and optionally in conjunction with the user terminal, which of the at least one ball game device has a highest or most suitable state of charge and should be used for play.

2. The mobile charging station according to claim 1, further comprising:
   one or more induction coils for inductive charging of the at least one ball game device, at least one induction coil provided per holding mechanism or one or more common induction coils provided for all of the at least one holding mechanism.

3. The mobile charging station according to claim 1, wherein the first transmission technology is short-distance radio in an ISM frequency band, and the second transmission technology is one of Bluetooth, WLAN, NFC, RFID, UHF and a wired connection.

4. The mobile charging station of claim 1, wherein the at least one ball game device is fixed mechanically and/or magnetically in the at least one holding mechanism, and wherein the at least one holding mechanism includes an alignment element for positioning the at least one ball game device into an optimal position for supplying energy to the at least one ball game device from the at least one internal energy source of the charging station and/or for enabling data exchange between the charging station and the at least one ball game device.

5. The mobile charging station of claim 3, further comprising one or more interfaces for an external device, wherein via the one or more interfaces, the external device can be supplied with energy from the at least one internal energy source or the at least one internal energy source can be charged by the external device, and a bidirectional data exchange is enabled between the charging station and the external device via the one or more interfaces.

6. The mobile charging station of claim 5, wherein the charging logic controller includes further instructions for: monitoring a state of charge of the at least one internal energy source and, in the event that the state of charge drops below a threshold state of charge, regulating the energy supplied from the at least one internal energy source to the charging station; and deactivating the charging of the external device.

7. The mobile charging station of claim 1, further comprising an internal GPS module for locating the charging station; and a communication module for retrieving locating data from an external locating module, wherein the locating data is transmitted to the at least one ball game device via the communication module.

8. The mobile charging station of claim 7, further comprising at least one storage module for storing game data received via the communication module from the connected at least one ball game device.

9. The mobile charging station of claim 1, further comprising at least one microphone for recording game noise of the at least one ball game device, the game noise including a sound of a golf ball being hit.

10. The mobile charging station of claim 1, further comprising a network processor having routing logic for establishing a meshed network between the charging station and one or more communication partners including one or more other charging stations.

11. The mobile charging station of claim 1, further comprising a fastening element for fastening the charging station to one or more of a piece of sporting equipment, a mobile user terminal, and an item of clothing, the piece of sporting equipment including a golf bag, a golf caddy, and a golf cart, the mobile user terminal including a mobile telephone, and wherein the fastening element is integrated directly into the piece of sporting equipment or the item of clothing.

12. A system for locating a ball game device comprising:
   at least one ball game device having an integrated locating element; and
   a mobile gateway for enabling communication of the ball game device with a user terminal, wherein the mobile gateway includes:
      an internal energy source;
      a holding mechanism for holding the ball game device while it is supplied with energy drawn from the internal energy source;
      a first communication module for wireless communication with the ball game device in accordance with a first transmission technology;
      a second communication module for communication with the user terminal in accordance with a second transmission technology, differing from the first transmission technology; and
      a charging logic controller which includes computer readable instructions which when executed cause the controller to:
         identify that the at least one ball game device is placed in the at least one holding mechanism;
         detect a state of charge of a held ball game device;
         start supplying the energy to the held ball game device based on the detected state of charge; and
         indicate, via visual and/or acoustic signals to a user, and optionally in conjunction with the user terminal, which of the at least one ball game device has a highest or most suitable state of charge and should be used for play.

13. A ball game device, comprising:
at least one internal rechargeable energy source for supplying energy to an internal locating module and an internal communication module, wherein the ball game device can be held and charged by a mobile charging station, and wherein the internal communication module transmits data via a first transmission standard to the mobile charging station on which the ball game device is held,
wherein the at least one internal rechargeable energy source is a lithium-ion battery with ceramic solid-state electrolyte, and
wherein the battery includes a plurality of battery layers stacked to form an upper and a lower battery half-shell or a pyramid, and wherein electronics are received in the ball game device in a cavity formed in between the upper and lower battery half-shells or the pyramid.

14. The ball game device according to claim 13, further comprising at least one RF module for communication by short-distance radio.

15. The ball game device of claim 14, further comprising a pair of inner half-shells encasing the electronics and the battery, the device further comprising an antenna structure including separate antenna elements coupled to each half-shell of the pair of inner half-shells.

16. The ball game device of claim 15, wherein the antenna structure is communicatively coupled to each of the internal locating module and the at least one RF module.

17. The ball game device of claim 13, wherein the ball game device is configured as a golf ball.

* * * * *